United States Patent
Chakravarthy et al.

(10) Patent No.: US 9,817,683 B2
(45) Date of Patent: Nov. 14, 2017

(54) OPTIMIZED REMEDIATION POLICY IN A VIRTUALIZED ENVIRONMENT

(71) Applicant: Dell Products, LP, Round Rock, TX (US)

(72) Inventors: Sridhar Chakravarthy, Bangalore (IN); Thanga Prakash Somasundaram, Salem (IN)

(73) Assignee: Dell Products, LP, Round Rock, TX (US)

(*) Notice: Subject to any disclaimer, the term of this patent is extended or adjusted under 35 U.S.C. 154(b) by 148 days.

(21) Appl. No.: 14/152,487

(22) Filed: Jan. 10, 2014

(65) Prior Publication Data

US 2015/0199205 A1 Jul. 16, 2015

(51) Int. Cl.
*G06F 9/48* (2006.01)
*G06F 9/455* (2006.01)

(52) U.S. Cl.
CPC .......... *G06F 9/455* (2013.01); *G06F 9/45558* (2013.01); *G06F 9/4856* (2013.01); *G06F 2009/4557* (2013.01)

(58) Field of Classification Search
CPC ................................. G06F 9/455–2009/45595
See application file for complete search history.

(56) References Cited

U.S. PATENT DOCUMENTS

| | | | |
|---|---|---|---|
| 7,925,923 B1 * | 4/2011 | Hyser et al. | 714/13 |
| 8,161,126 B2 | 4/2012 | Fan | |
| 8,175,863 B1 * | 5/2012 | Ostermeyer | G06F 17/5009 703/13 |
| 8,291,159 B2 * | 10/2012 | Rajagopal et al. | 711/111 |
| 8,296,760 B2 * | 10/2012 | Magenheimer et al. | 718/1 |
| 8,448,170 B2 * | 5/2013 | Wipfel et al. | 718/1 |
| 8,732,699 B1 * | 5/2014 | Hyser et al. | 718/1 |
| 8,910,152 B1 * | 12/2014 | Hyser et al. | 718/1 |
| 9,038,086 B2 * | 5/2015 | Dees et al. | 718/104 |
| 9,135,031 B1 * | 9/2015 | Knight | G06F 9/455 |
| 9,213,573 B2 * | 12/2015 | French | G06F 9/4856 |
| 9,678,774 B2 * | 6/2017 | Khesin | G06F 9/45533 |
| 2006/0085668 A1 * | 4/2006 | Garrett | G06F 9/5061 714/4.1 |
| 2006/0195715 A1 * | 8/2006 | Herington | G06F 9/5077 714/4.2 |

(Continued)

OTHER PUBLICATIONS

"SR-IOV Networking in Xen: Architecture, Design and Implementation," Dong et al, pp. 1-7.

(Continued)

*Primary Examiner* — Tuan Q. Dam
*Assistant Examiner* — Zheng Wei
(74) *Attorney, Agent, or Firm* — Larson Newman, LLP

(57) ABSTRACT

A system includes a first host system, a second host system, and a remediation module. The first host system includes a processor, a first virtual machine, and a second virtual machine. The remediation module is operable to receive an event generated by a resource of the first host system and migrate the first virtual machine to the second host system in response to determining that the event affects the first virtual machine and does not affect the second virtual machine. The first host system continues to run the second virtual machine in response to determining that the event affects the first virtual machine and not the second virtual machine.

20 Claims, 3 Drawing Sheets

(56) References Cited

U.S. PATENT DOCUMENTS

| | | | |
|---|---|---|---|
| 2008/0104587 A1* | 5/2008 | Magenheimer et al. | 718/1 |
| 2008/0244579 A1* | 10/2008 | Muller | G06F 9/5027 718/100 |
| 2009/0077552 A1* | 3/2009 | Sekiguchi | G06F 9/45558 718/1 |
| 2009/0210527 A1* | 8/2009 | Kawato | G06F 9/45558 709/224 |
| 2009/0222558 A1* | 9/2009 | Xu et al. | 709/224 |
| 2010/0005465 A1* | 1/2010 | Kawato | G06F 9/455 718/1 |
| 2010/0115049 A1* | 5/2010 | Matsunaga | G06F 3/0626 709/216 |
| 2010/0191845 A1* | 7/2010 | Ginzton | G06F 9/4856 709/224 |
| 2010/0242045 A1* | 9/2010 | Swamy | G06F 9/455 718/104 |
| 2010/0306381 A1* | 12/2010 | Lublin et al. | 709/226 |
| 2010/0306767 A1* | 12/2010 | Dehaan | G06F 9/5022 718/1 |
| 2010/0325381 A1* | 12/2010 | Heim | G06F 9/455 711/170 |
| 2011/0010691 A1* | 1/2011 | Lu | G06F 11/3688 717/124 |
| 2011/0099267 A1* | 4/2011 | Suri | G06F 9/4856 709/224 |
| 2011/0126207 A1* | 5/2011 | Wipfel et al. | 718/104 |
| 2011/0283277 A1* | 11/2011 | Castillo | G06F 9/5077 718/1 |
| 2011/0307716 A1* | 12/2011 | Diab | 713/300 |
| 2012/0084445 A1* | 4/2012 | Brock | G06F 9/5077 709/226 |
| 2012/0167085 A1 | 6/2012 | Subramaniyan et al. | |
| 2012/0173757 A1* | 7/2012 | Sanden | G06F 9/45558 709/238 |
| 2012/0304170 A1* | 11/2012 | Morgan | G06F 9/45558 718/1 |
| 2013/0014107 A1* | 1/2013 | Kirchhofer | 718/1 |
| 2013/0073731 A1 | 3/2013 | Bose et al. | |
| 2013/0086580 A1* | 4/2013 | Simonsen | G06F 9/45558 718/1 |
| 2013/0219386 A1* | 8/2013 | Geibel | G06F 9/5061 718/1 |
| 2013/0311989 A1* | 11/2013 | Ota et al. | 718/1 |
| 2014/0283051 A1* | 9/2014 | Doron et al. | 726/23 |
| 2014/0325515 A1* | 10/2014 | Salmela et al. | 718/1 |
| 2015/0040127 A1* | 2/2015 | Dippenaar | G06F 9/4856 718/1 |
| 2015/0052528 A1* | 2/2015 | French | G06F 9/4856 718/1 |
| 2015/0169349 A1* | 6/2015 | Joffe | 718/1 |
| 2015/0193248 A1* | 7/2015 | Noel et al. | 718/1 |
| 2016/0004863 A1* | 1/2016 | Lazri | G06F 9/45558 726/23 |

OTHER PUBLICATIONS

"High Performance Network Virtualization with SR-IOV," Dong et al., IEEE High Performance Computer Architecture (HPCA), 2010 IEEE 16th International Symposium, Jan. 2010, pp. 1-10.

\* cited by examiner

OPTIMIZED REMEDIATION POLICY IN A VIRTUALIZED ENVIRONMENT

FIELD OF THE DISCLOSURE

This disclosure relates generally to information handling systems, and more particularly relates to an optimized remediation policy in a virtualized environment of an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purpose of this disclosure an information handling system can be implemented on one or more information handling system. An information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Figure 1:
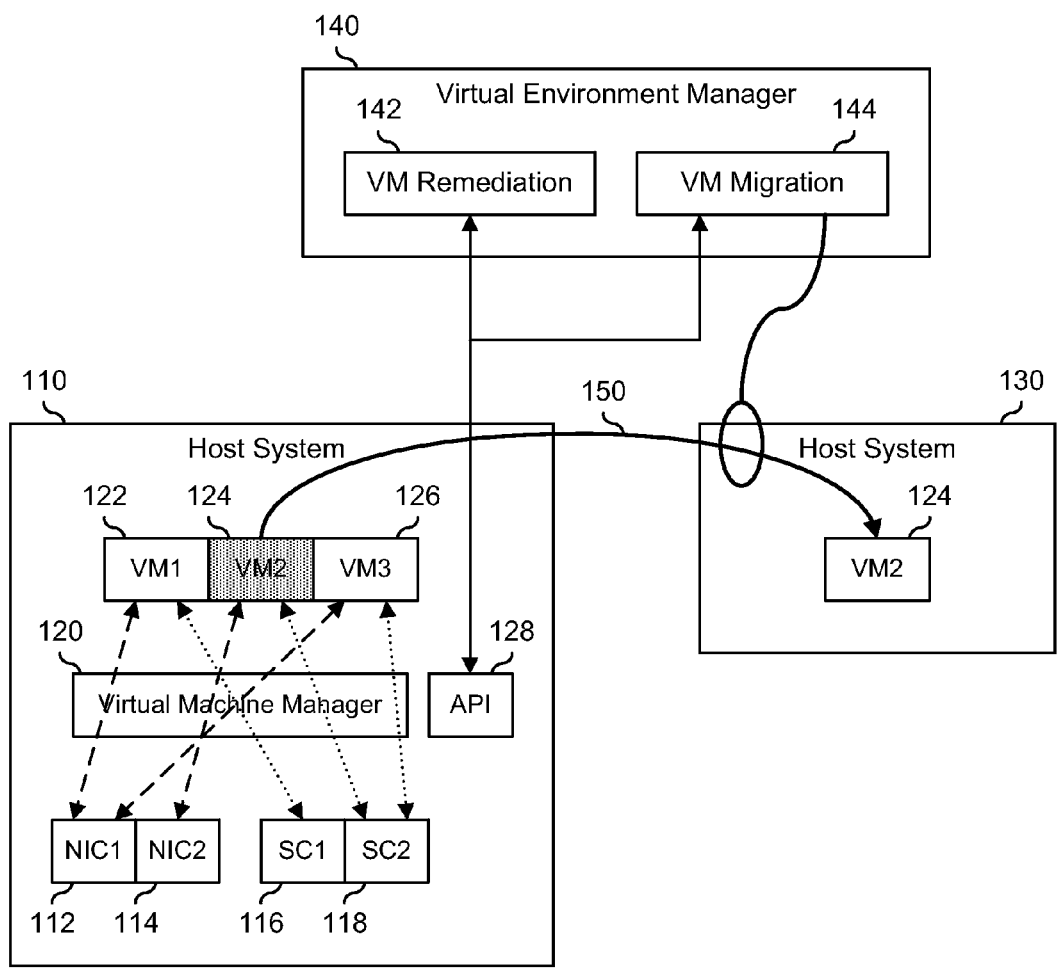
FIGS. 1 and 2 are block diagrams illustrating a virtualized environment according to an embodiment of the present disclosure.

FIG. 1 illustrates an embodiment of a virtualized environment 100 including host systems 110 and 130, and a virtual environment manager 140. Host system 110 includes resources such as network interface devices 112 and 114, and storage controllers 116 and 118, a virtual machine manager 120, and an application programming interface (API) 128. Virtual machine manager 120 operates to launch virtual machines 122, 124, and 126 on host system 110, and allocates the resources to the virtual machines as needed or desired to perform various workloads. In a particular embodiment, virtual machine 122 is associated with network interface device 112 and to storage controller 116, virtual machine 124 is associated with network interface device 114 and to storage controller 118, and virtual machine 126 is associated with network interface device 112 and to storage controller 118. The skilled artisan will understand that VMs 122, 124, and 126 can each be associated with one or more additional resources, such as a redundant network interface device or a redundant storage controller. In a particular embodiment, host system 110 includes additional resources, such as processors or processor cores, memory devices, or other resources. Here, virtual machine manager 120 can allocate the additional resources to one or more of virtual machines 122, 124, and 126.

Virtual environment manager 140 includes a virtual machine remediation module 142 and a virtual machine migration module 144. Virtual environment manager 140 operates to manage the virtualization of workloads in virtualized environment 100. As such, virtual environment manager 140 can receive a workload request from a user of virtualized environment 100. The workload represents a processing environment and one or more processing tasks that, when in operation in virtualized environment, utilize a known quantity of processing resources of the virtualized environment. For example, a workload can utilize a known number of processing threads, and memory resources, and can be allocated a particular network access bandwidth and a quantity of storage resources. Virtual environment manager 140 can determine whether one or more of host systems 110 and 130 have sufficient available processing resources to it instantiate a virtual machine to implement the workload. For example, if host systems 110 has sufficient available processing resources, virtual environment manager 140 can direct virtual machine manager 120 to launch a virtual machine, such as one of virtual machines 122, 124, and 126, and to load the processing environment and processing tasks on the instantiated virtual machine. In a particular embodiment, API 128 operates to communicate the availability of resources on host system 110 to virtual environment manager 140.

Virtual environment manager 140 also operates to direct the migration of virtual machines between host system 110 and host system 130. As such, when virtual environment manager 140 determines to migrate a particular virtual machine, then the virtual machine migration module 144 operates to halt the particular virtual machine on the applicable host system 110 or 130, and directs the other host system to instantiate a virtual machine and to load the processing environment and processing tasks on the newly instantiated virtual machine. For example, virtual machine migration module 144 can migrate 150 virtual machine 124 from host system 110 to host system 130, by directing host system 130 to instantiate a copy of virtual machine 124 and to load the processing environment and processing tasks associated with virtual machine 124 onto the copy. A virtual machine manager on host system 130 that is similar to virtual machine manager 120 can associate the resources of the host system to the copy of virtual machine 124. For example, the virtual machine manager can allocate a network interface device similar to network interface device 114 to the copy of virtual machine 124, and can associate a storage controller similar to storage controller 118 to the copy of the virtual machine. In a particular embodiment, the virtual machine can allocate additional resources, such as a redundant network interface device, a redundant storage controller, a processor or processor core, a memory device, or another resource to the copy of virtual machine 124.

In a particular embodiment, virtual machine migration module 144 also operates to capture a processing state of the workload operating on the original virtual machine, and to reproduce the processing state on the newly instantiated virtual machine. In this way, the migration of a virtual machine from one host system to another is done seamlessly, from the perspective of the consumer of the processing tasks being performed on the virtual machine. For example, virtual machine migration module 144 can operate to copy data stored in a memory associated with a storage controller allocated to the original virtual machine onto a memory associated with a newly allocated storage controller of the newly instantiated virtual machine.

In a particular embodiment, API 128 operates to detect events generated by the resources of host system 110. An event can include hardware or software generated alert, a failure, a loss of connectivity, a core or processor thermal event, a bad memory error, or other conditions that affect the operability of the resources of host system 110. In particular, an event is detected when the functionality of the resource that generated the event is diminished or eliminated. For example, a network interface device can lose network connectivity, a storage controller can detect a failing disk in a storage array, a bank of memory in a memory module can fail, a processor can hang, or another event can occur that causes one or more processes to be effected by the event. In a particular embodiment API 128 is included as a function provided by virtual machine manager 120. In another embodiment, API 128 is included as a function provided by a pre-boot or runtime environment, such as a basic input/output system (BIOS) or a Unified Extensible Firmware Interface (UEFI).

Figure 2:
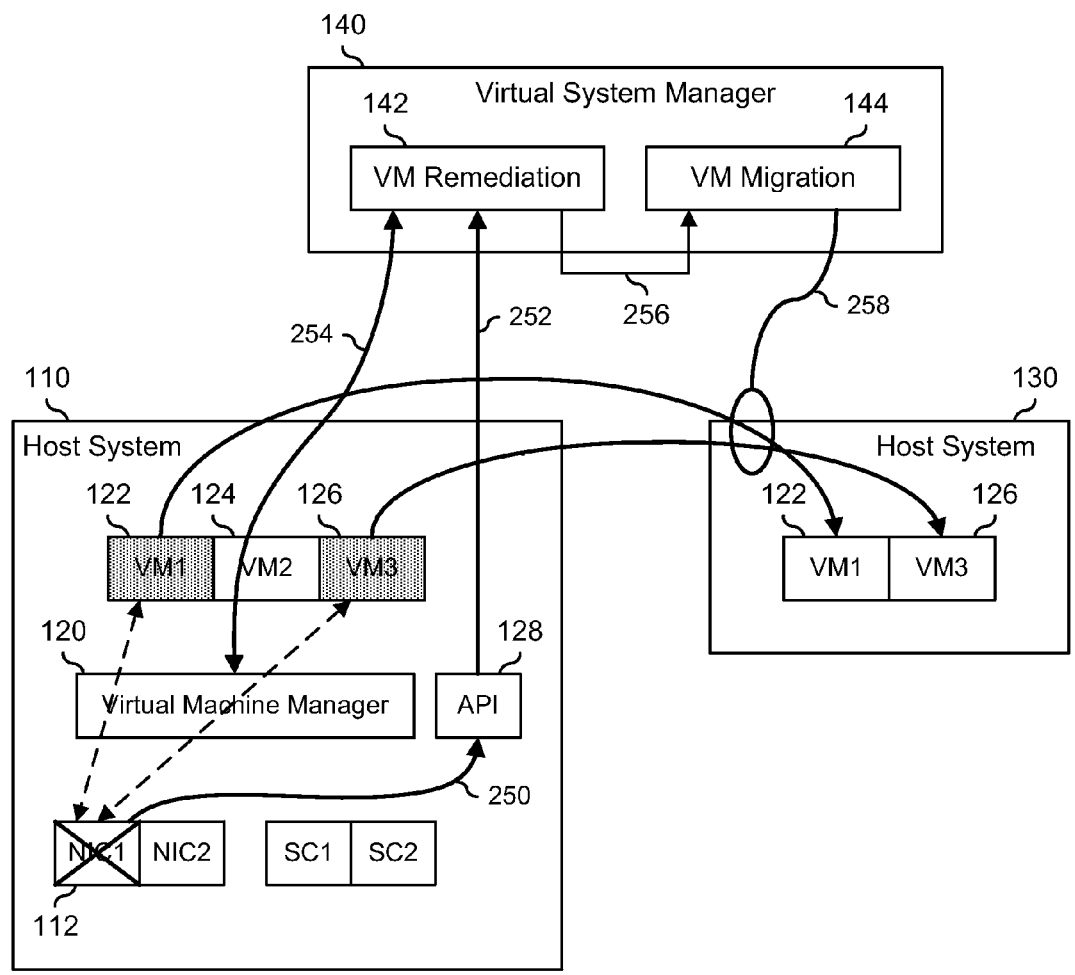

FIG. 2 illustrates an example of virtualized environment 100 where API 128 has detected an event in network interface device 112. Virtual machine remediation module 142 operates to receive an indication of the event from API 128, determines which virtual machines 122, 124, or 126 are adversely impacted by the event, and directs virtual machine migration manager 144 to migrate those virtual machines to host system 130, as described above.

FIG. 2 also illustrates a method of migrating selected virtual machines from host system 110 to host system 130 in response to the detection of the event in network interface device 112. In particular, API 128 receives an event 250 from network interface device 112 and provides information 252 to virtual machine remediation module 142 that identifies the hardware and software instances of the resource on which the alert was generated. For example, if network interface device 112 includes a virtualization capability, such that each of virtual machines 122 and 126 interact with the network via virtual NICs instantiated on the network interface device, then API 128 can provide virtual machine remediation module 142 with the MAC address of the network interface device, and the MAC addresses of the virtual NICs. Virtual machine remediation module 142 then provides the information 254 to virtual machine manager 120, and requests the virtual machine manager to provide a list of the virtual machines 254 that are associated with the identified hardware or software instances, that is, virtual machines 122 and 126. Virtual machine remediation module 142 directs 256 virtual machine migration module 144 to migrate 258 the effected virtual machines 122 and 126 to host system 130. In this way, an event in the resources of host system 110 does not precipitate the migration of all of the virtual machines 122, 124, and 126 instantiated on the host system, but only causes the migration of the virtual machines 122 and 124 that are impacted by the event. Similarly, events in the other resources of host system 110 can precipitate the migration of a subset of virtual machines 122, 124, and 126. Table 1 illustrates the virtual machines that are migrated based upon which resource generates the event.

TABLE 1

| Virtual Machine Migration | |
|---|---|
| Generating Resource | Migrated Virtual Machine |
| NIC 1 | VM 1, VM 3 |
| NIC 2 | VM 2 |
| SC1 | VM 1 |
| SC2 | VM 2, VM 3 |

In a particular embodiment, host system 110 is made available to instantiate new workloads, even when one or more resources has generated an alert. For example, consider the case where network interface device 112 has generated an alert and virtual machines 122 and 126 have been migrated to host system 130. If virtual environment manager 140 determines that a new workload only needs access to one network interface device, then the virtual environment manager can determine to launch the workload on host system 110 based upon the fact that network interface device 114 is still operational. In this way, the operational resources of host system 110 can be more effectively utilized.

In a particular embodiment, virtual machine remediation module 142 is included as a function provided by virtual machine manager 120. In another embodiment, virtual machine remediation module 142 is included as a function provided by a pre-boot or runtime environment, such as a basic input/output system (BIOS) or a Unified Extensible Firmware Interface (UEFI) of one or more of host systems 110 and 130.

The skilled artisan will understand that the method described above is not meant to be limiting to the scope of the disclosure, and that other resources of an information handling system can generate alerts that impact a subset of virtual machines instantiated on the information handling system. For example, a bank of memory or a processor in an information handling system may only be utilized by a subset of the virtual machines, and thus an event generated by the memory bank or the processor would only precipitate the migration of the subset of virtual machines.

Figure 3:
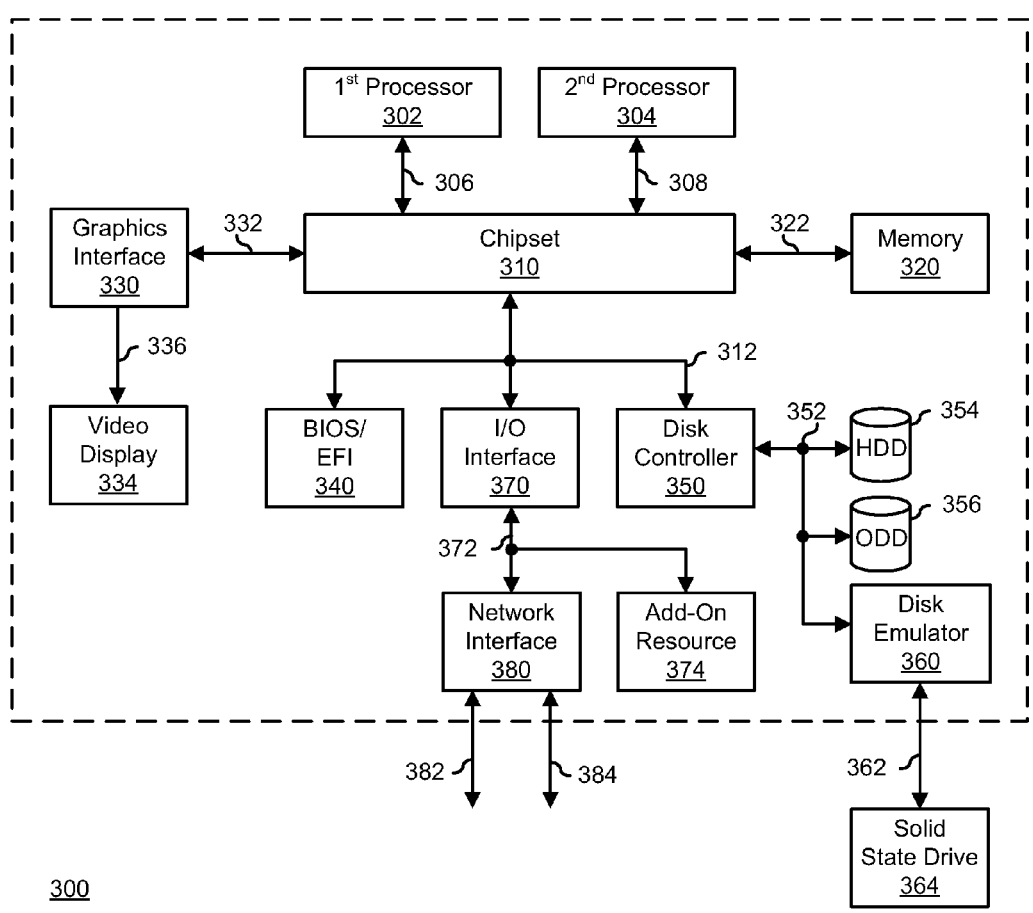
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374 and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    a first host system including a processor, a first resource, a second resource, a first virtual machine, and a second virtual machine, wherein the first virtual machine is associated with the first resource and not with the second resource, and the second virtual machine is associated with the second resource and not the first resource;
    a second host system; and
    a remediation module that:
        receives an event generated by the first resource; in response to
            determining that the event is received from the first resource and functionality of the first resource is diminished;
            identifying hardware and software instances of the first resource on which the event was generated;
            determining the first virtual machine is impacted by the received event;
            captures a processing state of a workload operating on the first virtual machine, wherein the workload represents a processing environment and one or more processing tasks;
            migrates the first virtual machine to the second host system; and
            reproduces the captured processing state on the migrated first virtual machine on the second host system;
    wherein the first host system continues to run the second virtual machine and launches a third virtual machine associated with the second resource in response to determining that the event affects the first virtual machine and not the second virtual machine.

2. The system of claim 1, wherein:
    the first host system further includes an application programming interface (API) that receives the event from the first resource and sends the event to the remediation module.

3. The system of claim 2, wherein:
    the API further provides information to the remediation module, wherein the information identifies one of a hardware instance and a software instance of the first resource.

4. The system of claim 3, wherein:
    the first host system further includes a virtual machine manager (VMM); and
    the remediation module further:
        provides the information to the VMM; and
        receives an indication that the event affects the first virtual machine and does not affect the second virtual machine from the VMM, wherein migrating the first virtual machine is based upon the indication.

5. The system of claim 4, further comprising:
    a migration module that migrates the first virtual machine to the second host system.

6. The system of claim 1, wherein:
    the first host system further includes a fourth virtual machine associated with the first resource and not with the second resource;
    the remediation module further migrates the fourth virtual machine to the second host system in response to determining that the event is received from the first resource.

7. The system of claim 1, further comprising:
    a virtualized environment manager, wherein the remediation module is included in the virtualized environment manager.

8. The system of claim 1, wherein the remediation module is included in the first host system.

9. A method comprising:
    receiving, at a remediation module, an event generated by a resource of a first host system;
    determining that the event is received from the resource and functionality of the resource is diminished;
    identifying hardware and software instances of the resource on which the event was generated;
    determining a first virtual machine is impacted by the received event;
    capturing, by the remediation module, a processing state of a workload operating on the first virtual machine of the first host system, wherein the workload represents a processing environment and one or more processing tasks;
    migrating the first virtual machine from the first host system to a second host system in response to determining that the event affects the first virtual machine and does not affect a second virtual machine;
    reproducing the captured processing state on the migrated first virtual machine on the second host system;
    running, on the first host system, the second virtual machine in response to determining that the event affects the first virtual machine and not the second virtual machine; and
    launching a third virtual machine on the first host system in response to determining that the event affects the first virtual machine and not the second virtual machine.

10. The method of claim 9, further comprising:
    receiving, at an application programming interface (API) the event from the resource; and
    sending the event to the remediation module.

11. The method of claim 10, further comprising:
providing, by the API, information to the remediation module, wherein the information identifies a hardware instance and a software instance of a resource.

12. The method of claim 11, further comprising:
providing the information to a virtual machine manager (VMM); and
sending, to the remediation module, an indication that the event affects the first virtual machine and does not affect the second virtual machine, from the VMM, wherein the determining, by the remediation module, that the event affects the first virtual machine and does not affect the second virtual machine is based upon the indication.

13. The method of claim 9, further comprising:
migrating a third virtual machine from the first host system to the second host system in response to determining that the event affects the third virtual machine.

14. The method of claim 9, wherein the remediation module is included in a virtualized environment manager.

15. The method of claim 9, wherein the remediation module is included in the first host system.

16. A non-transitory computer-readable medium including code for performing a method, the method comprising:
receiving, at a remediation module, an event generated by a resource of a first host system;
determining that the event is received from the resource and functionality of the resource is diminished;
identifying hardware and software instances of the resource on which the event was generated;
determining a first virtual machine is impacted by the received event;
capturing, by the remediation module, a processing state of a workload operating on the first virtual machine of the first host system, wherein the workload represents a processing environment and one or more processing tasks;
migrating the first virtual machine from the first host system to a second host system in response to determining that the event affects the first virtual machine and does not affect a second virtual machine;
reproducing the captured processing state on the migrated first virtual machine on the second host system;
running, on the first host system, the second virtual machine in response to determining that the event affects the first virtual machine and not the second virtual machine; and
launching a third virtual machine on the first host system in response to determining that the event affects the first virtual machine and not the second virtual machine.

17. The computer-readable medium of claim 16, the method further comprising:
receiving, at an application programming interface (API) the event from the resource; and
sending the event to the remediation module.

18. The computer-readable medium of claim 17, the method further comprising:
providing, by the API, information to the remediation module, wherein the information identifies a hardware instance and a software instance of a resource.

19. The computer-readable medium of claim 18, the method further comprising:
providing the information to a virtual machine manager (VMM); and
sending, to the remediation module, an indication that the event affects the first virtual machine and does not affect the second virtual machine, from the VMM, wherein the determining, by the remediation module, that the event affects the first virtual machine and does not affect the second virtual machine is based upon the indication.

20. The computer-readable medium of claim 16, the method further comprising:
migrating a third virtual machine from the first host system to the second host system in response to determining that the event affects the third virtual machine.

* * * * *